March 18, 1947.  D. T. MOWRY  2,417,608
ELECTRICAL CONDUCTOR
Filed April 26, 1944
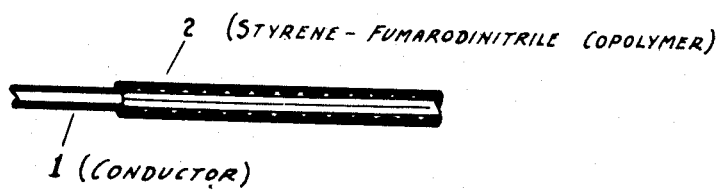
DAVID T. MOWRY INVENTOR.
BY Herbert Phase
ATTORNEY Patented Mar. 18, 1947

2,417,608

UNITED STATES PATENT OFFICE 2,417,608

ELECTRICAL CONDUCTOR

David T. Mowry, Dayton, Ohio, assignor to Monsanto Chemical Company, St. Louis, Mo., a corporation of Delaware Application April 26, 1944, Serial No. 532,870

7 Claims. (Cl. 174—121)

This invention relates to electrical conductors provided with an insulating and/or dielectric material comprising an interpolymer of styrene and fumaronitrile (fumaric acid dinitrile).

According to my invention an electrical conductor is provided with an insulating mass or film of a resinous interpolymer of styrene and fumaronitrile. The resinous mass may take a variety of forms as will be apparent from the following description. The interpolymer may be molded by injection methods or by other methods. It may be extruded into films, threads or tubes or may be dissolved in a solvent with or without added plasticizers and may be cast as a film upon metal, glass, wood or upon textile fabrics. Films produced by casting, extruding or in any other manner, may be stretched both longitudinally and laterally and improved flexural properties imparted thereto. Such stretched materials may be applied to electrical conductors as insulating tapes or coverings.

Electrical conductors carrying currents tend to heat and at times may develop fairly high temperatures within themselves and in surrounding bodies. Insulating materials in contact therewith are subjected at times to fairly high temperatures. A serious problem, therefore, exists in providing a suitable insulating material which will retain its dimensional stability and impact strength at elevated temperatures. This is particularly true in the case of those devices made of molded plastic parts in which electrical conductors may be embedded.

Stretched films of polystyrene have been employed as electrical insulation in the form of tapes which are wound around a current carrying conductor or cable. Such tapes retain their flexibility as long as the temperature to which they are subjected does not exceed a certain relatively low value. When, however, they are heated to above the critical temperature a rearrangement of the polystyrene molecules takes place with resulting loss of flexibility.

Films or tapes prepared from my styrene fumaronitrile interpolymer and subjected to a two-dimensional stretching possess a high degree of flexibility and the property of retaining this flexibility at considerably higher temperatures than do polystyrene tapes.

My interpolymer may also be employed as an insulating dielectric for capacitors. Such devices are commonly constructed of thin, metallic foils or plates, the adjacent plates being insulated from each other by means of paper or other insulating material which may be impregnated or coated with the herein disclosed interpolymer. Clear films of the interpolymer or plasticized films thereof may also be employed.

Coils of wire for electrical machinery, as field and armature coils, may be impregnated with a solution of the present copolymer dissolved in a volatile solvent and the solvent evaporated by the application of heat. In certain cases electrical conductors may be provided with an insulating and supporting mass of the herein described interpolymer in such a manner as to serve to bond the conductors into a unitary assembly. Such a structure is resistant to the action of most inorganic solvents and to high temperatures. Insulating materials for coaxial cables may be formed from the present interpolymers by molding, casting or by other methods.

Styrene-fumaronitrile copolymers are generally disclosed in my copending application, Serial No. 450,514, filed July 11, 1942, and in the copending application of Reid G. Fordyce, Serial No. 503,941, filed September 27, 1943, both of these applications being assigned to the same assignee as is the present invention. They may be obtained by polymerizing mixtures of styrene and fumaronitrile by certain polymerization methods. In monomeric mixtures of styrene and fumaronitrile containing less than 30% by weight of fumaronitrile under certain conditions, the nitrile polymerizes more rapidly than does the styrene. Hence, in order to obtain uniform products a constant ratio of styrene to fumaronitrile should be maintained in the reaction mixture during the polymerization. Also, when working with monomer mixtures containing less than 30% by weight of fumaronitrile, the fumaronitrile content of the copolymer is always greater than that of the monomeric mixture. For example, a monomeric mixture consisting of 95% by weight of styrene and 5% by weight of fumaronitrile yields a copolymer having a fumaronitrile content of about 19.5%. As the fumaronitrile content of the monomer mixture approaches 30%, however, the difference between the fumaronitrile content of the monomeric mixture and that of the copolymer becomes gradually less; so that with a monomeric mixture consisting of 75% by weight of styrene and 25% by weight of fumaronitrile, there is obtained a copolymer having a fumaronitrile content of about 28.6%. Hence in the following description when styrene-fumaronitrile copolymers are stated to have a certain weight percent of fumaronitrile, it should be understood that such a fumaronitrile content refers to that actually present in the copolymerized state in the copolymers and not to that present in the monomeric mixture employed for the preparation of the copolymers.

Interpolymers containing from, say, 0.5% to 35% by weight of copolymerized fumaronitrile, the balance of the interpolymer being styrene, are particularly suitable for use as electrical insulating materials. Within the above range the interpolymer is characterized by a high degree of electrical resistance, mechanical strength and heat stability. Generally, interpolymers containing up to 20% of copolymerized fumaronitrile are moldable by injection methods, while interpolymers containing between 20% and 35% are generally moldable by compression methods. An interpolymer containing between 13% and 14% of copolymerized fumaronitrile is moldable by injection methods under conditions somewhat similar to those employed for molding polystyrene. However, the heat distortion point determined according to the A. S. T. M. method has a value of 107° C. to 110° C., (e. g. considerably above the boiling point of water) while the heat distortion point of polystyrene is only about 76° C. to 78° C. Hence, polystyrene suffers considerable distortion from exposure to temperatures normally encountered in electrical apparatus.

With respect to resistance by the attack of chemical agents the styrene-fumaronitrile interpolymer containing between 10% and 35% by weight of copolymerized fumaronitrile are not attacked by either weak or strong bases or by weak acids. There is no tendency to hydrolyze the copolymerized nitrile groups in the polymer. An interpolymer containing in the range of 10% to 20% of copolymerized fumaronitrile is insoluble in gasoline and alcohol, but is soluble in aromatic hydrocarbons. Interpolymers having a higher fumaronitrile content than 20% are insoluble in aromatic solvents as well as in gasoline and in alcohol.

The thermal properties as measured by softening or melting point and the ASTM heat distortion point show gradually increasing values as the content of copolymerized fumaronitrile increases. For example, the heat-distortion points of styrene-fumaronitrile copolymers vary as follows with the nitrile content of the same:

| Per cent copolymerized fumaronitrile in Interpolymer | A. S. T. M. heat distortion point, °C. |
| --- | --- |
| 2.5 | 84 |
| 5.5 | 94 |
| 14.0 | 107 |
| 21.0 | 124 |
| 30.0 | 140 |

Although there is little variation in electric properties as the fumaronitrile content of the copolymer is increased, copolymers having a nitrile content of, say, from 5% to 20% are preferred for the production of articles by the injection molding process. When the content of fumaronitrile is higher than 20%, compression molding is usually preferred. However, when the copolymer is applied, for example, as a coating on copper wire or as an impregnating agent for insulating tape, for which applications molding is not required, these high fumaronitrile-containing copolymers are of great importance. They may be dissolved, for example, in dioxane, and the copper wire may be passed through solutions of the same or the solutions may be sprayed on the wire to yield coatings which do not flow or soften even when the coated wires are maintained at temperatures of from 115° C. to 125° C. for long periods of time. Tape or sheet insulation may be prepared by treating woven or felted organic or inorganic fabrics, for example, cotton or paper tape or glass fibers or fabrics or sheets of the same with solutions of the styrene-fumaronitrile copolymers. Sheet insulation may also be prepared by employing solutions of the copolymer as binding agents for inorganic materials having electrical insulating properties, for example, mica.

The moldable styrene-fumaronitrile copolymers may be molded or extruded as sheets and tubes which are suitable for use as dielectrics for ozonizers, or they may be cast from solution into thin sheets for use as dielectrics in ordinary condensers. The styrene-fumaronitrile copolymers may also be molded into a large number of objects designed for use with electrical equipment, for example, into vacuum tube bases, instrument panel boards, screw driver handles, housings for electrical equipment, switch bases, radio parts, etc.

The invention is further illustrated, but not limited, by the following examples:

*Example 1*

A styrene-fumaronitrile copolymer having a fumaronitrile content of 25% was prepared by mass polymerization of a monomeric mixture consisting of 15% of fumaronitrile and 85% by weight of styrene until approximately a 30% conversion of the monomer to polymer had been effected. The resulting viscous syrup was then poured into alcohol and agitated therewith, for example, in a Banbury mixer. Upon removing the alcohol and agitating the remaining polymeric material with fresh portions of alcohol, and repeating this operation several times there was obtained in granular form a styrene-fumaronitrile copolymer having a nitrile content of 25% and an alcohol-soluble content of less than 1.0%.

An approximately 15% by weight solution of this copolymer in dioxane was placed in a dipping vat, and a copper wire was passed slowly first through the solution, then through a drying chamber and finally through a die into a baking chamber. Passage of the wire into and through the dipping bath was effected by simply unwinding a reel of the copper wire, allowing it to remain in tension while it traveled through the bath and the drying chamber and then collecting the dried, coated wire on another reel which revolved at substantially the same rate as the first reel. The resulting coating ordinarily has a thickness of from 0.001 to 0.01 mm., depending upon the rate of passage through the treating bath; however, if heavier coatings are desired, the coating wire may be sent through the coating bath and drying chamber repeatedly until a plurality of coats has been applied and the desired thickness of film has been obtained.

Copper wire which has been coated by a single passage through the treating bath described above, dried at a temperature of from 50° C. to 100° C. and then passed through a baking furnace held at a temperature of from 250° C. to 300° C., as shown above, is smooth and glossy. The coating is unaffected by petroleum solvents, benzene, toluene, xylene, carbon tetrachloride or the lower alcohols. It is highly moisture resistant. It may be heated to temperatures of about 125° C. for long periods of time without either softening or flowing. The coated wire displays very good dielectric properties.

Example 2

The single figure of the accompanying drawing shows a conductor 1, provided with an insulating coating 2, the coating consisting of a styrene-fumaronitrile copolymer.

A styrene-fumaronitrile copolymer having a fumaronitrile content of from 13% to 14% was prepared substantially according to the procedure described in Example 1, except that the fumaronitrile concentration of the monomeric mixture was maintained at about 2.0% instead of at 13%. The resulting granular copolymer was dried, then ground into finer particles and milled. A small quantity of a green organic dye was mixed with the copolymer by milling. The milled copolymer was injection molded into radio coil forms employing the following molding conditions:

| | | |
|---|---|---|
| Front heater | °F | 470 |
| Back heater | °F | 460 |
| Mold temperature | °F | 160 |
| Ram pressure on | p. s. i. | 1000 |
| Booster on | seconds | 5 |
| High pressure on | do | 45 |
| Low pressure on | do | 15 |

The material extruded readily from the nozzle and the molded pieces were clear and uniform. They were not distorted after being kept in air at a temperature of 110° C. for 24 hours or by immersion in boiling water for a time of one hour. The finished coil forms had very good mechanical and electrical properties.

Example 3

In this example a styrene-fumaronitrile copolymer having a fumaronitrile content of 14% was injection molded into radio tube supports having six metal prong inserts. The colored and milled copolymer was molded in a 6-ounce Reid-Prentiss injection machine using the following molding conditions:

| | | |
|---|---|---|
| Front heater | °F | 470 |
| Back heater | °F | 460 |
| Mold temperature | °F | 160 |
| Pressude on ram | p. s. i. | 1000 |
| Booster on | seconds | 4.5 |
| Full pressure on | do | 13 |
| Clamp on | do | 36 |

Pieces ejected under these conditions were filled out with no indication of cracking or weld lines on the coil cylinder. There were no voids or bubbles around the metal inserts. Electrical insulating properties of the molded piece were very good.

In order to test the heat resistance of the molded coils they were kept at a temperature of 105° C. for a time of 14 days. At the end of this time there was no loss of dimensional stability or warping. When the molded test pieces were kept at 100% relative humidity for 14 days at a temperature of 110° F. there was no change in the weight of the same or any evidence of warping or dimensional change. The electrical properties of the molded piece were substantially unchanged after either the heat test or the humidity test.

Other molded pieces requiring a high degree of heat-resistance simultaneously with very good mechanical and electrical properties may be similarly molded, for example, radio tube sockets, fuse casings, etc.

In the preparation of insulated conductors, the most generally satisfactory results are obtained when the styrene-fumaronitrile copolymer is applied directly to the conductor from solution as herein shown. However, if desired, the copolymer may be extruded upon the wire. Also, for certain purposes the resinous coating may be employed in conjunction with other materials generally used in insulatings, for example, cotton, silk, rubber, gutta percha, etc., either as an under coating, upon which the above insulating materials are applied or as an after coating therefor. The resinous solutions may also be employed as saturating, impregnating or sealing varnish for sealing coils of wire as for the construction of magnets or armatures, or as a saturant for textile materials, for example, cotton or paper tape, used for insulating purposes. Also, instead of using solutions of styrene-fumaronitrile copolymers, dispersions of the same in a non-solvent liquid such as water or alcohol may be employed.

Insulating materials may also be prepared by laminating the copolymer with textiles or other fibrous materials. Alternate layers of an asbestos or cotton fabric and the powdered copolymer may be compression molded to give sheets or blocks of material having very high impact strength and excellent electric properties. The laminates may also be prepared by compression molding of alternate layers of the fibrous material and a film or thin sheet of the copolymer.

For certain purposes films of the copolymers as such may be employed as insulating agents. For example, the copolymer may be extruded into thin ribbons, which upon longitudinal and transverse stretching possess improved flexibility and may be used as a tape for winding around cables or wires. Stretched or unstretched films may be laminated, by molding, and applied to metal foils, and the resulting coated metal foil may be used as a wire insulating agent or as a dielectric material in condensers. The coated metal foils may also be prepared by coating the foils with a solution of the copolymer and then allowing the solvent to evaporate.

If desired, plasticizers, fillers or other adjuvants may be incorporated into the styrene-fumaronitrile copolymer, either before or after the copolymerizing step. In the preparation of the molded pieces, such adjuvants are advantageously added to the copolymer by milling, grinding, etc., previous to the molding operation. In the preparation of films, the plasticizers, etc., may also be added to the solution from which the films are cast.

It is understood that the above description is given by way of illustration only, and not of limitation, and that deviations are possible within the spirit of the invention, the scope of which is limited only by the following claims:

What I claim is:

1. An electrical conductor embedded in a resinous polymeric material comprising an interpolymer of styrene and fumarodinitrile, said interpolymer consisting of between 0.5% and 30% of copolymerized fumarodinitrile, the balance of said interpolymer being copolymerized styrene.

2. An electrical conductor embedded in a molded polymeric material comprising an interpolymer of styrene and fumarodinitrile, said interpolymer consisting of between 0.5% and 30% of copolymerized fumarodinitrile, the balance of said interpolymer being copolymerized styrene.

3. An electrical conductor and an insulating material in contact therewith which comprises a stretched film of an interpolymer consisting of styrene and fumarodinitrile, said interpolymer containing between 0.5% and 30%, the balance thereof being copolymerized styrene.

4. An electrical conductor and an insulating material in contact therewith which comprises a laterally and longitudinally stretched film of an interpolymer consisting of styrene and fumarodinitrile, said interpolymer containing between 0.5% and 30% of copolymerized fumarodinitrile, the balance thereof being copolymerized styrene.

5. An electrical conductor and an insulating material in contact therewith which comprises fibrous material impregnated with an interpolymer consisting of styrene and fumarodinitrile, said interpolymer containing between 0.5% and 30% of copolymerized fumarodinitrile, the balance thereof being copolymerized styrene.

6. An electrical conductor and an insulating material in contact therewith which comprises a textile fibrous material impregnated with an interpolymer consisting of styrene and fumarodinitrile, said interpolymer containing between 0.5% and 30% of copolymerized fumarodinitrile, the balance thereof being copolymerized styrene.

7. An electrical conductor having upon its surface a film of an interpolymer consisting of styrene and fumarodinitrile and a plasticizer said interpolymer containing between 0.5% and 30% of copolymerized fumarodinitrile, the balance thereof being copolymerized styrene.

DAVID T. MOWRY.

REFERENCES CITED

The following references are of record in the file of this patent:

UNITED STATES PATENTS

| Number | Name | Date |
|---|---|---|
| 2,178,365 | Brobst | Oct. 31, 1939 |
| 1,824,850 | Ward | Sept. 29, 1931 |
| 2,324,426 | Robie | July 13, 1943 |

FOREIGN PATENTS

| Number | Country | Date |
|---|---|---|
| 814,093 | French | Mar. 8, 1937 |